United States Patent
Jonsson et al.

(10) Patent No.: US 6,414,990 B1
(45) Date of Patent: Jul. 2, 2002

(54) TIMING RECOVERY FOR A HIGH SPEED DIGITAL DATA COMMUNICATION SYSTEM BASED ON ADAPTIVE EQUALIZER IMPULSE RESPONSE CHARACTERISTICS

(75) Inventors: Ragnar Jonsson; Sverrir Olafsson; Elias Bjarnason, all of Reykjavik (IS)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/162,493

(22) Filed: Sep. 29, 1998

(51) Int. Cl.⁷ .......................... H03H 7/30; H03K 5/159
(52) U.S. Cl. ...................... 375/232; 375/233
(58) Field of Search ................ 375/219, 232, 375/233, 234; 370/286, 290, 291; 379/410, 411; 708/323; 333/18, 28 R (56) References Cited

U.S. PATENT DOCUMENTS

| | | |
|---|---|---|
| 4,004,226 A | 1/1977 | Qureshi et al. |
| 4,344,176 A | 8/1982 | Quereshi |
| 4,669,092 A | 5/1987 | Sari et al. |
| 4,964,118 A * | 10/1990 | Aly et al. ............... 370/291 |
| RE34,206 E * | 3/1993 | Sayar ..................... 375/293 |
| 5,309,484 A | 5/1994 | McLane et al. |
| 5,471,501 A * | 11/1995 | Parr et al. ............... 375/354 |
| 5,581,585 A | 12/1996 | Takatori et al. |
| 5,675,612 A * | 10/1997 | Solve et al. ............. 375/326 |
| 6,240,128 B1 * | 5/2001 | Manerjea et al. ........ 375/222 |

OTHER PUBLICATIONS

Jeremy Tzeng, et al., Timing Recovery in Digital Subscriber Loops Using Baud–Rate Sampling, Nov. 1986, IEEE Journal on Selected Areas in Communications SAC–4, No. 8, pp. 1302–1311.

Antoni Fertner, et al., Symbol–Rate Timing Recovery Comprising the Optimum Signal–to–Noise Ratio in a Digital Subscriber Loop, Aug. 1997, IEEE Transactions on Communications, vol. 45, No. 8, pp. 925–936.

* cited by examiner

Primary Examiner—Don N. Vo
(74) Attorney, Agent, or Firm—Farjami & Farjami LLP (57) ABSTRACT

A preferred timing recovery scheme is particularly suitable for a high speed digital data communication system that employs T-spaced equalization in the receiving device, where echo cancellation occurs after equalization. The timing recovery technique is based upon an analysis of the impulse response of the equalizer structure (e.g., a structure having a feedforward equalizer and a decision feedback equalizer). The filter tap coefficients of the equalizer elements are analyzed and the sampling phase is adjusted such that a cost function associated with the performance of the equalizer structure is substantially optimized. The sampling phase of the receiver is adjusted in response to a control signal generated as a result of the timing recovery techniques.

24 Claims, 5 Drawing Sheets

TIMING RECOVERY FOR A HIGH SPEED DIGITAL DATA COMMUNICATION SYSTEM BASED ON ADAPTIVE EQUALIZER IMPULSE RESPONSE CHARACTERISTICS

FIELD OF THE INVENTION

The present invention relates generally to high speed digital data communication systems. In particular, the present invention relates to timing recovery solutions for use with such digital data communication systems.

BACKGROUND OF THE INVENTION

Timing recovery is an important issue in many digital communication systems because the received signal must be sampled at an appropriate rate associated with the transmitter. In systems having no direct locking between the transmitter and receiver clocks, the receiver may be configured to track the transmitter clock, to monitor changes in the sampling rate, and to monitor changes in the sampling phase. Generally, timing recovery techniques seek to obtain an optimum receiver sampling rate along with an optimum receiver sampling phase.

Conventional timing recovery techniques for use with T-spaced receiver equalizers assume that the analyzed signal is free from interference such as echo or near end cross talk (NEXT). Practical high speed applications supporting 1,000,000 (or more) symbols per second cannot efficiently perform echo cancellation after equalization unless auxiliary echo cancellation procedures are implemented. Accordingly, it may be difficult to perform timing recovery based on the received signal in the presence of echo without further equalizing the signal used for the timing recovery analysis.

Because only one sample per symbol is taken in a T-spaced arrangement, timing recovery can be difficult to maintain. One prior art system utilizes a trial and error technique to find optimal sampling phase during the start up or initialization period. Such a trial and error timing recovery scheme may test several sampling phases to determine an optimum sampling phase for the current communication session. Although this may lead to acceptable immediate results, the repeated testing of sampling phases may require an unreasonable amount of time. Furthermore, such a technique cannot continuously monitor changes in line characteristics (e.g., as a result of temperature variations) during normal operation.

Other conventional timing recovery techniques can be interfered with during equalizer adaptation. Consequently, such prior art techniques cannot be effectively implemented in systems where the equalizers are periodically or continuously updated in accordance with variations in the channel characteristics.

In very high speed applications, conventional timing recovery methods based on digital signal processors may not be adequate because the processing speed may not be sufficiently fast. Accordingly, it would be desirable to implement a hardware model for a timing recovery technique compatible with high speed applications.

SUMMARY OF THE INVENTION

Accordingly, it is an advantage of the present invention that an improved timing recovery technique for a digital data communication system is provided.

Another advantage of the present invention is that it provides a timing recovery technique that is based on the impulse response of the receiver equalizer structure.

Another advantage is that the present invention provides a timing recovery technique that is suitable for use in a receiver having T-spaced equalizers.

A further advantage is that the timing recovery technique can be used in a receiver where echo cancellation is performed after equalization of the received signal.

Another advantage of the present invention is that it provides a timing recovery technique that can be effectively utilized throughout the normal operating mode of the digital data communication system and while the receiver equalizers are being updated.

A further advantage is that a timing recovery processing circuit according to the present invention can be implemented with high speed digital logic components in lieu of a digital signal processor.

The above and other advantages of the present invention may be carried out in one form by a timing recovery method for a high speed data communication device. The method obtains data indicative of a plurality of filter tap coefficients associated with an adaptive equalizer structure employed by the high speed data communication device, processes the data to quantify a cost function associated with an impulse response of the adaptive equalizer structure, and generates a sampling phase control signal. The sampling phase control signal is configured to adjust a sampling element associated with the high speed data communication device to thereby substantially optimize the cost function.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF PREFERRED EXEMPLARY EMBODIMENTS

The present invention may be described herein in terms of functional block components and various processing steps.

It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in any number of data communication contexts and that the system described herein is merely one exemplary application for the invention. Further, it should be noted that the present invention may employ any number of conventional techniques for data transmission, training, signal processing and conditioning, and the like. Such general techniques that may be known to those skilled in the art are not described in detail herein.

Figure 1:
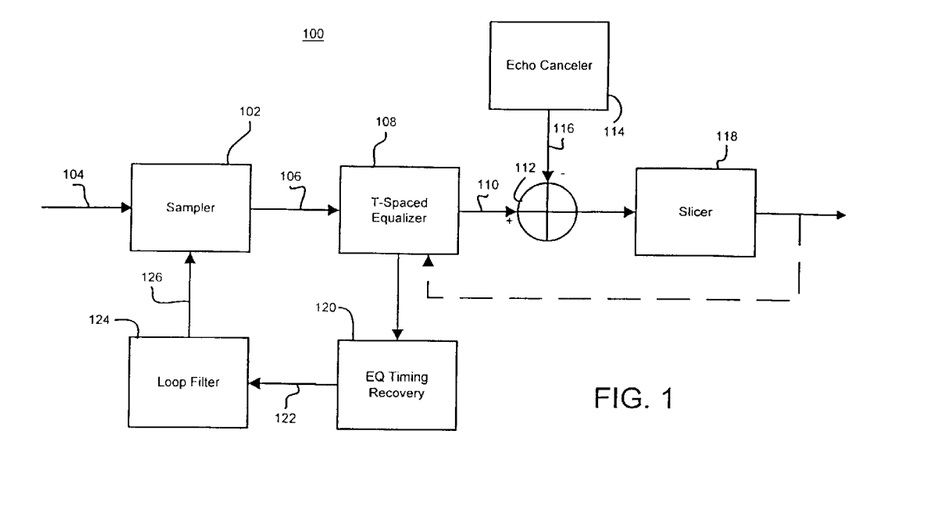
FIG. 1 is a schematic representation of a portion of an exemplary digital communication receiver configured in accordance with the present invention.
Figure 2:
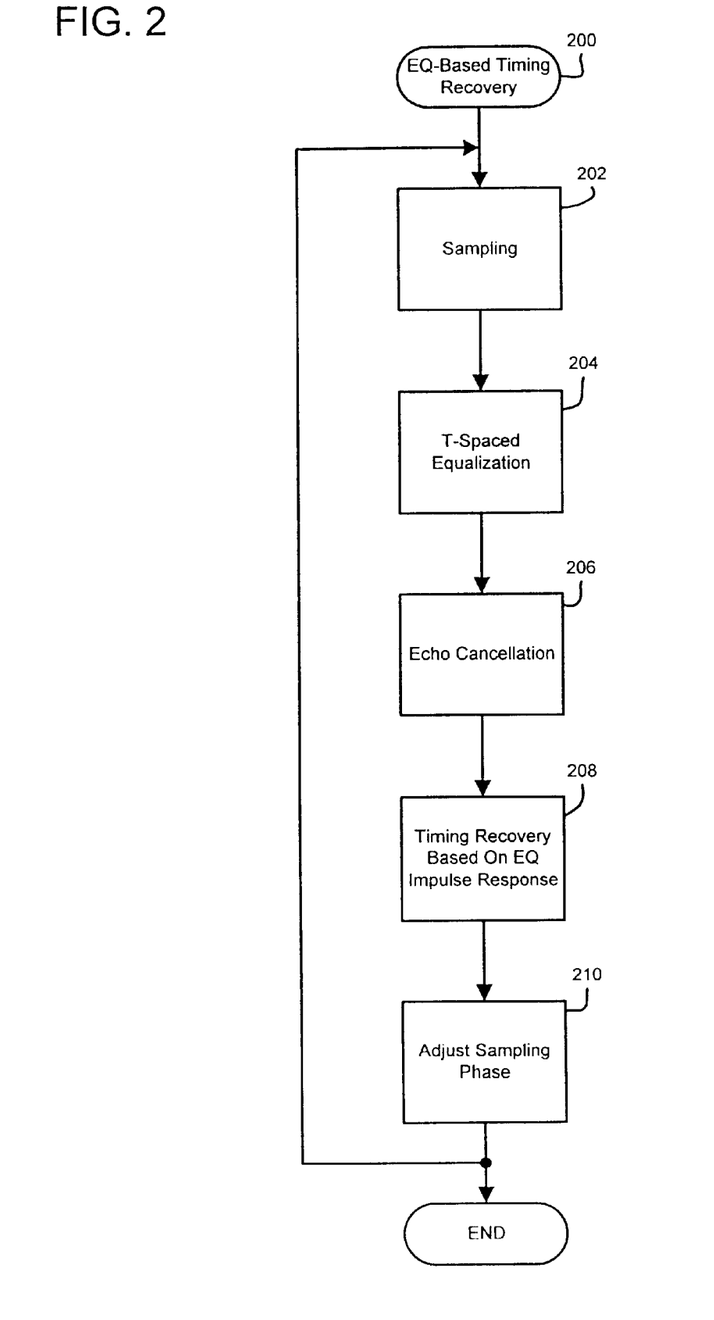
FIG. 2 is a flow diagram of an equalizer-based timing recovery process that may be performed by the receiver shown in FIG. 1.

Referring to FIG. 1, a portion of an exemplary digital data communication receiver 100 is illustrated in schematic form. FIG. 2 is a flow diagram of an exemplary equalizer-based timing recovery process 200 that may be performed by receiver 100 to monitor, regulate, and maintain a suitable sampling phase associated with a received signal. Process 200 may be performed during an initialization period or during a normal operating mode associated with the given digital data communication system. Although not a requirement of the present invention, receiver 100 and process 200 are particularly suited for use with a high speed digital communication system (e.g., a system that transmits data at speeds in excess of 1,000,000 symbols per second) that employs T-spaced equalizers. In the context of this description, "T-spaced" means that receiver 100 only takes one sample per received symbol.

It should be appreciated that this description assumes that receiver 100 has obtained a suitable sampling rate associated with the transmit sampling rate. Any number of known techniques can be used for this purpose. The techniques of the present invention are preferably utilized to monitor and regulate the sampling phase of the received signal. However, modifications to the sampling phase may result in a sampling rate change; in this manner, process 200 may also affect the sampling rate of receiver 100.

Receiver 100 includes a sampler 102, which is configured to sample a received signal 104 to thereby obtain a sampled signal 106 having a sampling phase. The received signal 104 may be a signal that is representative of a plurality of transmitted digital symbols. Sampler 102 preferably performs task 202 associated with process 200. For purposes of the exemplary embodiments described herein, sampler 102 may be considered to be a T-spaced sampler, i.e., sampler 102 samples signal 104 once per symbol. In the context of this description, an early sampling phase means that sampler 102 samples received signal 104 earlier in time relative to the desired sampling point, and a late sampling phase means that sampler 102 samples received signal 104 later in time relative to the desired sampling point. Receiver 100 also includes an adaptive equalizer structure 108, which is configured to equalize sampled signal 106 (task 204). In the preferred embodiment, equalizer structure 108 is a T-spaced equalizer. During task 204, equalizer structure 108 is preferably being updated, i.e., its filter tap coefficients are being adaptively adjusted.

Equalizer structure 108 is preferably configured to compensate for transmission channel characteristics. Equalizer structure 108 is an adaptive equalizer structure having adjustable parameters, e.g, filter taps, that control the operation of equalizer structure 108. In a practical embodiment, equalizer structure 108 may be realized by any number of filter components. For example, equalizer structure 108 may include a feedforward equalizer (FFE), a decision feedback equalizer (DFE), a noise predictor (NPD), or the like, or any suitable combination of such components (see FIG. 3 for one preferred embodiment). The dashed line in FIG. 1 indicates that equalizer structure 108 may be responsive to a feedback signal taken or derived from an output associated with receiver 100. These, and other equalizer and filter arrangements known to those skilled in the art, may be employed in the context of the present invention. A number of such prior art elements are described in detail in ADAPTIVE FILTER THEORY (3rd ed. 1996) by Simon Haykin, the entire contents of which are incorporated herein by reference.

Equalizer structure 108 generates an equalized signal 110, which is fed into a summer 112. Summer 112 also receives an input from an echo canceler 114 configured to produce an echo estimate 116 for an echo signal generated in response to a signal transmitted by a transmitter located at the same terminal equipment as receiver 100. For example, a full duplex digital communication device can receive signals from a remote device while transmitting outgoing signals. The outgoing signals may produce an echo signal that interferes with the incoming signal. In a practical embodiment, echo canceler 114 may be configured as an adaptive equalizer structure. Echo estimate 116 may be generated in response to the known signal that is being concurrently transmitted by a corresponding transmitter.

Summer 112 is preferably configured to subtract echo estimate 116 from equalized signal 110. Alternatively, any suitable element or process may be employed as a means to remove or subtract the unwanted echo signal from the equalized signal 110. In this manner, an echo cancellation task 206 may be realized (see FIG. 2). In the illustrated embodiment, the output of summer 112 is fed into a slicer 118, which is configured to quantize the output of summer 112 into one of a plurality of predetermined digital levels. In some embodiments, the output of slicer 118 is fed back into equalizer structure 108 (as depicted by the dashed lines).

As described in more detail below, a timing recovery element 120 may employ a number of techniques to perform timing recovery (task 208). In accordance with a preferred aspect of the present invention, timing recovery element 120 is operatively associated with equalizer structure 108. Timing recovery element 120 is configured to receive data representative of a plurality of filter tap coefficients of equalizer structure 108, analyze the impulse response of equalizer structure 108 and/or a combined impulse response of equalizer structure 108 and another filter or equalizer element, and produce a sampling phase control signal 122.

Timing recovery element 120 is suitably configured to produce sampling phase control signal 122 such that a cost function associated with an impulse response of equalizer structure 108 is substantially optimized. Accordingly, sampling phase control signal 122 may be a $\Delta t$ value that indicates a desired sampling time shift associated with a current symbol. Sampling phase control signal 122 may indicate an exemplary amount of delay or advancement required to optimize the quantity or characteristic being analyzed by timing recovery element 120. The present invention assumes that the filter tap coefficients of equalizer structure 108 are being updated fast enough to reflect changes in the sampling phase. Otherwise, the sampling phase may shift without a corresponding modification to the filter tap coefficients.

A loop filter 124 may be utilized to condition or process control signal 122 such that a suitable sampling phase adjust signal 126 is generated. Thus, the output of timing recovery element 120 causes sampling phase adjust signal 126 to adjust the sampling phase of the received signal in an appropriate manner (task 210). As indicated in FIG. 2, timing recovery process 200 may continue indefinitely or be repeated in a periodic manner during the communication session to ensure that the current sampling phase is substantially optimized.

Notably, receiver 100 (configured with T-spaced equalizer structure 108) can effectively perform its timing recovery procedure with only one echo canceler 114. In the preferred arrangement, timing recovery element 120 produces sampling phase control signal 122 for a received signal having an echo signal present therein. In contrast, prior art implementations include one or more auxiliary echo cancelers (or equalizers) for removing the echo from the signal used by the timing recovery element. The primary echo canceler is then used specifically to remove the echo from the signal path. Such prior art receivers that employ multiple echo cancelers are costly to implement and may require additional computational capabilities.

Figure 3:
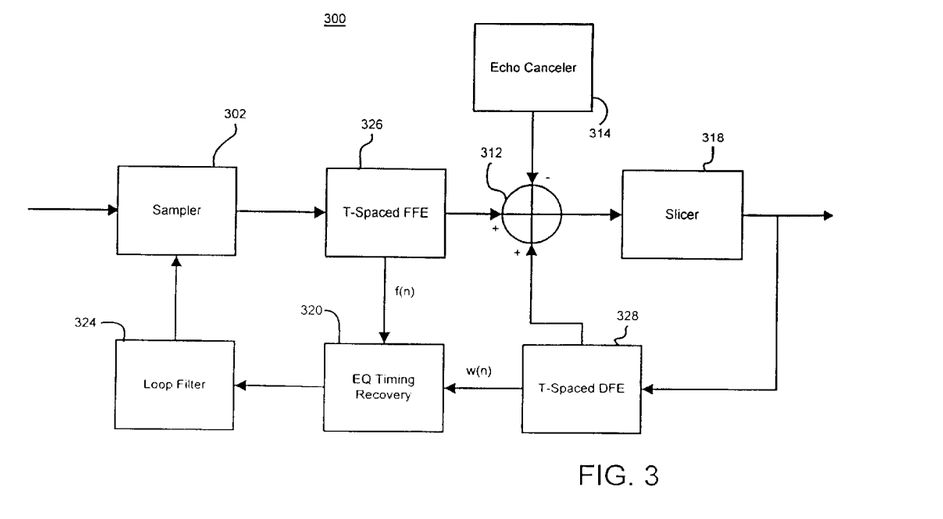
FIG. 3 is a schematic representation of a portion of an exemplary digital communication receiver configured in accordance with a preferred embodiment of the present invention.

FIG. 3 depicts a more detailed version of the receiver shown in FIG. 1. In particular, FIG. 3 shows a receiver 300 configured in accordance with a preferred embodiment of the present invention that employs feedforward and feedback equalizers. Receiver 300 preferably includes sampler 302, summer 312, echo canceler 314, slicer 318, timing recovery element 320, and loop filter 324; these elements are similar to their counterpart elements described above in connection with receiver 100. It should be noted that, in this embodiment, the equalized signal from which the echo estimate is subtracted is itself a sum of the equalized output associated with a feedforward equalizer (FFE) element 326 and the equalized output associated with a decision feedback equalizer (DFE) element 328.

The equalizer structure utilized by receiver 300 preferably includes FFE element 326 and DFE element 328. The filter tap coefficients associated with FFE element 326 are identified by f(n) and the filter tap coefficients associated with DFE element 328 are identified by w(n). The general arrangement and function of FFE/DFE equalizer structures are known to those skilled in the art and, accordingly, FFE element 326 and DFE element 328 will not be described in detail herein. A more detailed description of such elements may be found in Simon Haykin, ADAPTIVE FILTER THEORY (3rd ed. 1996).

Similar to timing recovery element 120, timing recovery element 320 may be operatively associated with FFE element 326 and DFE element 328. In other words, timing recovery element 320 is preferably configured to receive data indicative of the filter tap coefficients f(n) and w(n) and to analyze and process the coefficients in a suitable manner.

As described briefly above, timing recovery element 320 is configured to perform a timing recovery technique that is based on an analysis of the impulse response of the FFE/DFE equalizer structure. In practice, timing recovery element 320 seeks to optimize a cost function associated with the impulse response. In one preferred embodiment, timing recovery element 320 substantially optimizes an energy compactness cost function associated with the impulse response. In the context of this description, an "energy compactness cost function" means the concentration of the impulse response energy in a short time internal. For example, if the sampling phase is aligned with the transmit signal, then most of the impulse response energy can be represented with only a few samples. Although a number of energy compactness measurements and parameters may be analyzed, one preferred methodology calculates the square sum or the absolute sum of the "head" and the "tail" of the impulse response (i.e., the impulse response excluding the center of the impulse response). A practical choice for the energy compactness cost function is to use the square sum of the impulse response (after filtering by the forward or backward fractional delay filters), but excluding several samples, e.g., ten, near the peak (cursor) of the impulse response. Thus, in this manner timing recovery element 320 may analyze the energy compactness cost function and adjust the sampling phase accordingly.

Figure 4:
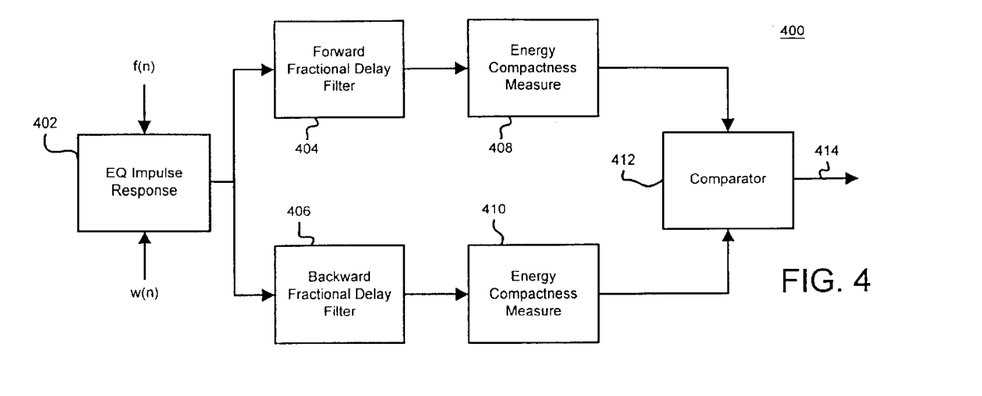
FIG. 4 is a schematic representation of an exemplary timing recovery processing element that employs fractional delay filters.

In this preferred embodiment, timing recovery element 320 employs fractional delay techniques to emulate the effect that different sampling phase adjustments would have on the impulse response of the FFE/DFE equalizer structure. Such emulation is desirable because, in a practical system, it is not feasible to actually adjust the sampling phase to perform diagnostic tests during normal operation. FIG. 4 is a schematic representation of an exemplary detailed configuration for a timing recovery element 400. As described above, timing recovery element 320 obtains the impulse response of FFE element 326, f(n), and the; impulse response of DFE element 328, w(n). The combined response of the FFE/DFE equalizer structure may be associated with an equalizer impulse response element 402.

The fractional delay technique analyzes the effect of inserting hypothetical fractional delay filters after sampling by sampler 302 but before equalization. The hypothetical change in sampling phase would alter the equalizer impulse response. The theoretical change in the equalizer impulse response can be evaluated by convoluting the hypothetical fractional delay filter impulse response with the actual impulse response of the equalizer structure. Thus, to evaluate the effect of the shifting the sampling phase, the combined impulse response of the FFE/DFE equalizer structure and the fractional delay filter is obtained and analyzed. For example, if inserting a given fractional delay improves the energy compactness cost function of the FFE/DFE equalizer impulse response, then a corresponding adjustment in the sampling phase should improve the performance of the FFE/DFE equalizer structure.

FIG. 4 illustrates that an exemplary embodiment may concurrently test for the effects associated with the insertion of a forward fractional delay filter 404 and a backward fractional delay filter 406. A corresponding energy compactness measurement 408, 410 is preferably performed to calculate the corresponding energy compaction parameters associated with the combined impulse responses. A comparator 412 may be utilized to determine which fractional delay filter produces a better result, i.e., more energy compaction in the combined impulse response. Additionally (or alternatively), comparator 412 may be configured to compare the energy compactness measurement associated with the forward/backward fractional delay with the energy compactness measurement associated with the uncompensated FFE/DFE equalizer structure. Comparator 412 may cause a sampling phase control signal 414 to be produced in response to the delay (or other suitable parameter) associated with the respective fractional delay filter. In a practical embodiment, the amount of sampling phase adjustment caused by sampling phase control signal 414 is based on the comparison performed by comparator 412.

Since this approach is based on the use of the overall impulse response of the equalizer elements, the impulse response of DFE-based systems must be evaluated. Although methodologies for evaluating the DFE impulse response may be relatively simple to implement, such evaluation requires computational overhead. To avoid the computational load, the DFE filter coefficients may be directly employed. However, in a practical system, the robustness of such a method may be compromised.

The above calculations of the impulse responses requires access to the filter tap coefficients of FFE equalizer element 326 and DFE equalizer element 328. However, such access is relatively easy to obtain in practical systems, and such access and calculation may be performed off-line without interfering with the normal operation of receiver 300. Furthermore, the computational complexity can be greatly reduced by using simplifications and approximations, and by exploiting symmetries in the calculations.

In one exemplary embodiment, forward fractional delay filter 404 and backward fractional delay filter 406 are finite impulse response (FIR) filters. With such FIR filters, the filter tap coefficients of backward delay filter 406 are the filter tap coefficients of forward delay filter 404 in reverse order. Thus, if forward delay filter 404 has the filter tap coefficients (A, B, C, D, F, G, H), then the coefficients of backward delay filter 406 would be (H, G, F, D, C, B, A).

Furthermore, for small fractional delays, the coefficients in this example would satisfy the following approximations: H≈-A, G≈-B, F≈-C, and D≈1. Thus, the forward and backward delay filters can be represented by the following coefficients (A, B, C, 1, -C, -B, -A) and (-A, -B, -C, 1, C, B, A), respectively. This leads to an efficient implementation of the filters based on a pure delay filter having the coefficients (0, 0, 0, 1, 0, 0, 0) and an anti-symmetric filter having the coefficients (A, B, C, 0, -C, -B, -A): the forward delay filter coefficients are the pure delay coefficients plus the anti-symmetric filter coefficients, and the backward delay filter coefficients are the pure delay coefficients minus the anti-symmetric filter coefficients. Moreover, the anti-symmetric filter itself can be implemented efficiently by exploiting its symmetry. It should be appreciated that the same type of approximations can apply to filters having various lengths, assuming that the filter length is an odd number.

The next derivation in the simplification is based on properties of linear time invariant systems. The equalizer impulse response is represented by the discrete time signal h(n), where n is the sample index, and the forward and backward fractional delay filters are represented by d0(n) and d1(n), respectively. Consequently, the forward and backward filter outputs are:

$p0(n)=d0(n)*h(n)$, and $p1(n)=d1(n)*h(n)$, where the asterisk represents the discrete convolution operator. If the forward and backward filters have the anti-symmetric property described above, then they can be represented as:

$p0(n)=z(n)+a(n)$, and $p1(n)=z(n)-a(n)$, where z(n) and a(n) are the outputs from filtering h(n) by the pure delay filter and the anti-symmetric filters, respectively. The difference in energy between the forward and backward filtered signals can be calculated as follows:

$$e(n) = p0^2(n) - p1^2(n)$$
$$= (z^2(n) + 2z(n)a(n) + a^2(n)) - (z^2(n) - 2z(n)a(n) + a^2(n))$$
$$= 4z(n)a(n).$$

Figure 5:
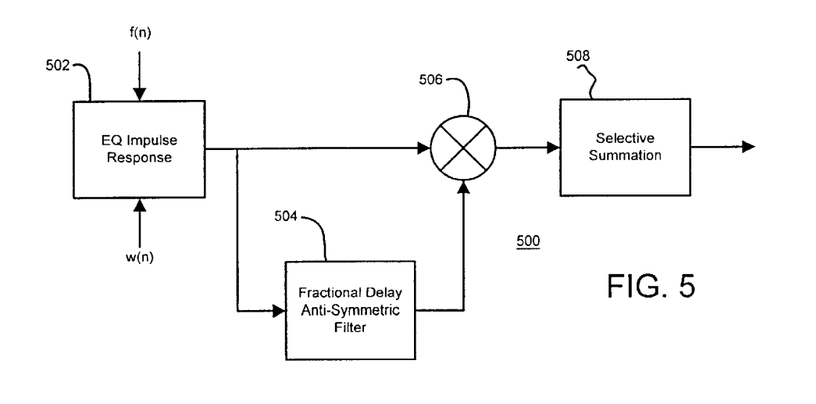
FIG. 5 and FIG. 6 are schematic representations of alternate timing recovery processing elements that employ fractional delay techniques.

FIG. 5 depicts a schematic representation of an alternate timing recovery element 500 configured to perform the simplified calculation described above. As in the previous embodiments, timing recovery element 500 obtains the impulse response 502 of the FFE/DFE equalizer structure. The pure delay filter, z(n), is represented by the connection directly from the impulse response 502 to a multiplier 506. It should be appreciated that multiplier 506 may be configured to accommodate the multiplying factor of four contained in the above relationship.

The anti-symmetric filter, a(n), is represented by the fractional delay anti-symmetric filter 504.

Figure 6:
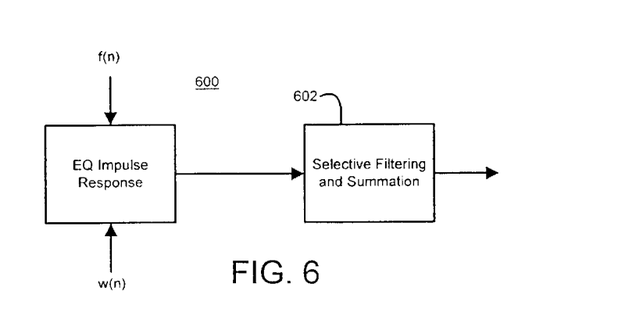

A selective summation element 508 may be employed to sum the error signal, e(n), over selected portions of the impulse response (described in more detail below). A detailed examination of the summation and the symmetric properties of the filters described above reveals that most of the terms in this sum will cancel each other out. The final sum in the selective summation will be determined by only a few terms of fractional delay anti-symmetric filter 504. This characteristic can be leveraged to simplify the computations even further; filtering and summation computations need only be performed for those terms that will not be canceled out in the sum. FIG. 6 depicts an alternate timing recovery element 600 that employs such a selective filtering and summation element 602.

One possible embodiment of the fractional delay approach is to operate the equalizers as normal in a tracking mode, where the updating of the filter tap coefficients is fast enough to track drifting in the sampling phase relative to the symbol rate. The equalizer filter tap coefficients are then inspected periodically to determine whether the sampling phase needs to be adjusted. The inspection may be based on the evaluation of two sampling phase changes (one forward and one backward in time) as described above. Such inspections could be performed relatively seldom in comparison to the symbol rate.

An alternate technique may be employed by timing recovery element 320 to regulate the sampling phase to thereby substantially optimize a cost function associated with the impulse response of the adaptive equalizer structure. This alternate technique is based on the measurement of the pre-cursor and post-cursor responses of the equalizer structure. The relative measures of the pre-cursor response and the post-cursor response are analyzed and the sampling phase is adjusted accordingly.

In a practical digital communication system having a relatively well-behaved channel (e.g., the channel does not have an unusually large amount of frequency dependent distortion), the impulse response of a T-spaced equalizer structure will have a large pre-cursor impulse response if the sampling of the received signal is late, i.e., after the optimal sampling time. Conversely, if the sampling of the received signal is early, then the T-spaced equalizer structure will have a large post-cursor impulse response. These operating characteristics can be empirically verified with practical systems and are caused in part by intersymbol interference caused by early or late sampling. The presence of intersymbol interference causes the equalizer structure to make corresponding adaptive adjustments to its impulse response. Consequently, if the sampling phase is optimized, then the pre-cursor response and the post-cursor response (after suitable normalizations) are balanced.

The above assumptions and observations form the basis for the following preferred timing recovery technique. Generally, a timing recovery element 700 may be suitably configured to measure the pre-cursor and post-cursor impulse responses of the FFE/DFE equalizer structure with, e.g., a pre-cursor energy measurement element 702 and a post-cursor energy measurement element 704 (see FIG. 7). The respective measurement elements 702, 704 may be configured to generate normalized measurement values such that an intelligent basis for comparison can be obtained. A comparator 706 performs a comparison analysis of the normalized pre-cursor and post-cursor response measurements to obtain a difference. It should be appreciated that measurement elements 702, 704 may be alternately configured to generate any desirable quantity based on the respective responses and that comparator 706 may be configured to process any suitable quantity associated with the pre-cursor and post-cursor responses.

Figure 7:
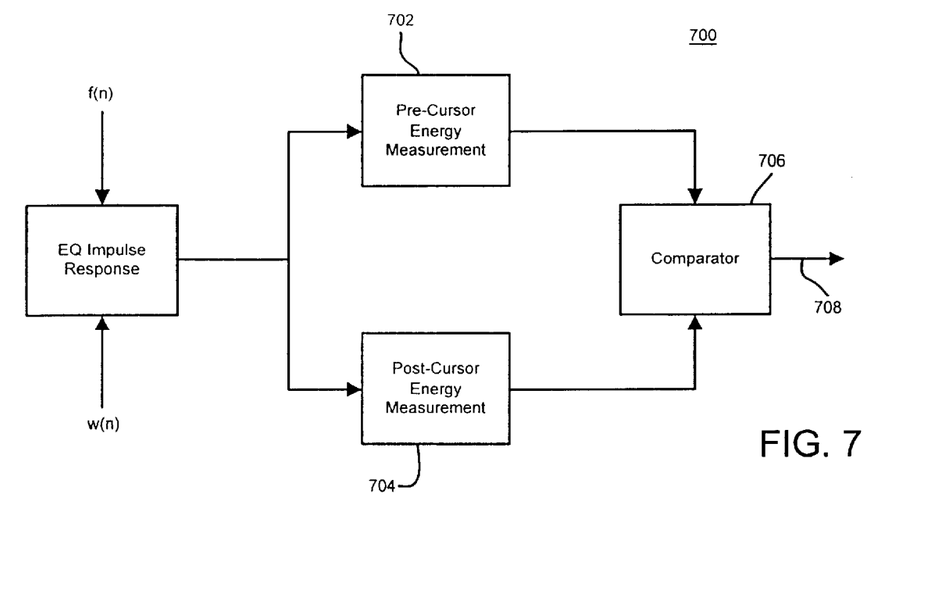
FIG. 7 is a schematic representation of an exemplary timing recovery processing element that measures and analyzes pre-cursor and post-cursor equalizer responses.

If the normalized pre-cursor measurement is larger than the normalized post-cursor measurement, then a control signal 708 may be produced such that the sampling time is moved forward relative to the received pulse. Conversely, if the normalized pre-cursor measurement is smaller than the normalized post-cursor measurement, then the sampling time is moved backward. In a practical embodiment, the sampling point is moved forward by advancing the sampling phase associated with sampler 302 (see FIG. 3) and moved backward by delaying the sampling phase.

As mentioned above, a variety of measurement quantities can be utilized as a basis for the above computations and comparisons. For example, the measurements can be based on one or more of the following techniques: square sum, square-root of square sum, absolute sum, alternating sum, and absolute value of alternating sum. Although the square sums are better estimates of the true energy measures of the pre-cursor and post-cursor responses, the absolute sum and the alternating sums may be easier to implement. The absolute sum and alternating sums may also provide better results.

Figure 8:
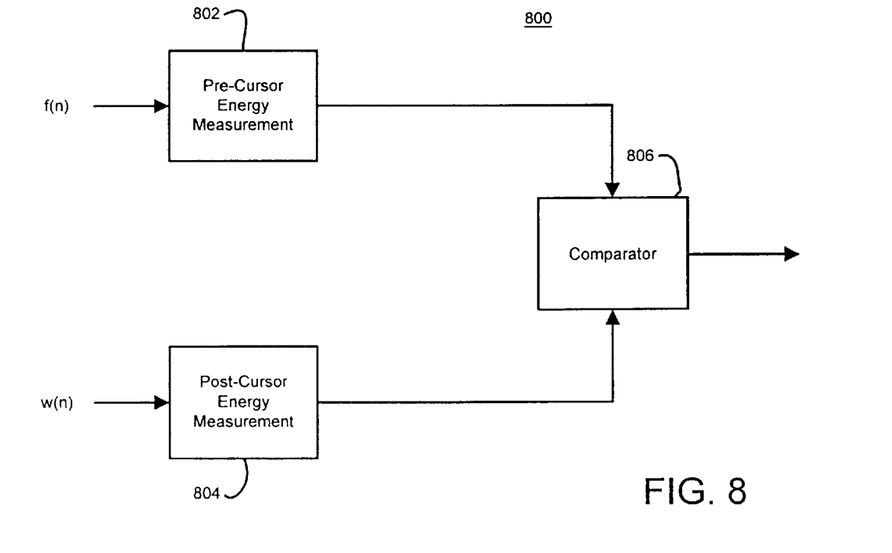
FIG. 8 is a schematic representation of an alternate timing recovery processing element that measures and analyzes pre-cursor and post-cursor equalizer responses.

When performing one of the above summing techniques, the filter tap coefficients of FFE element 326 may be directly used to estimate the pre-cursor energy measurement (rather than the impulse response of FFE element 326). Likewise, the filter tap coefficients of DFE element 328 may be directly used to estimate the post-cursor energy measurement. Accordingly, for purposes of this description, FFE element 326 may be considered to be a pre-cursive equalizer element and DFE element 328 may be considered to be a post-cursive equalizer element. This simplified arrangement is depicted in FIG. 8, where the filter tap coefficients- from FFE element 326,f(n), are processed by a pre-cursor energy measurement element 802, and the filter tap coefficients from DFE element 328, w(n), are processed by a post-cursor energy measurement element 804.

In a practical embodiment, pre-cursor measurement element 802 and post-cursor measurement element 804 may be configured to calculate an appropriate alternating sum based on the respective filter tap coefficients. For example, pre-cursor measurement element 802 may calculate a first sum of a number of the filter tap coefficients from FFE element 326, and post-cursor element 804 may calculate a second sum of a number of the filter tap coefficients from DFE element 328. Thereafter, a comparator 806 may compare the first and second sums to determine how best to adjust the sampling phase.

Figure 9:
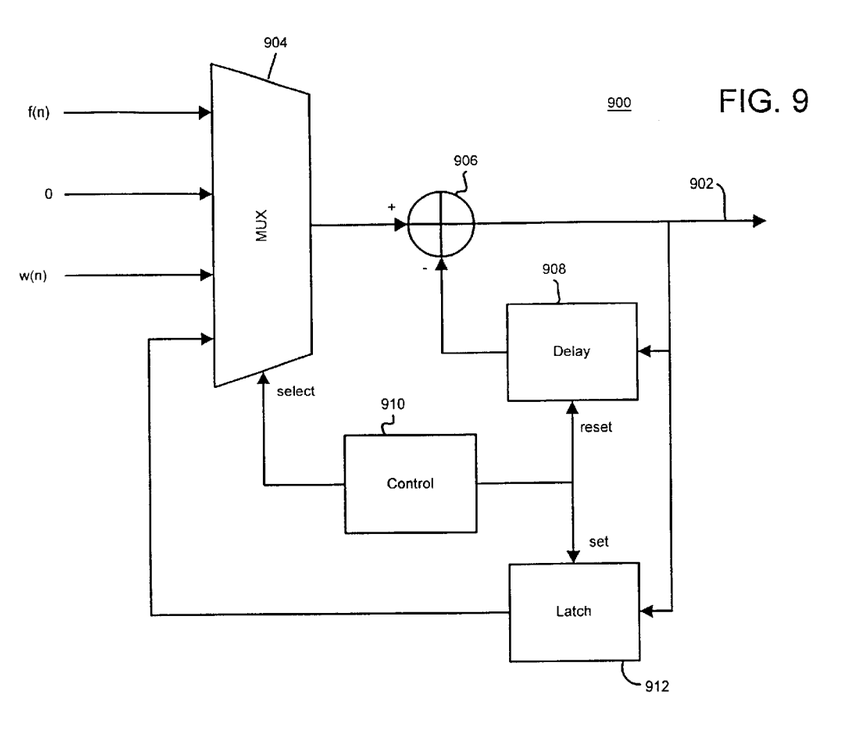
FIG. 9 is a schematic representation of an exemplary hardware solution for performing an alternate sum timing recovery technique.

In a preferred practical embodiment, the alternating sums of the first few filter tap coefficients of FFE element 326 and DFE element 328 are respectively utilized to estimate the pre-cursor energy and the post-cursor energy. All of the filter coefficients need not be included in the alternating sum because most of the relevant characteristic information can be extracted from a limited number of the initial filter tap coefficients. One exemplary technique calculates the absolute values of the two alternating sums before subtracting the sums. A preferred hardware implementation for carrying out this technique is illustrated in FIG. 9. A hardware implementation based on logic elements is preferred for high speed applications where digital signal processors are unsuitably slow.

Referring to FIG. 9, a practical implementation of an exemplary timing recovery element 900 is shown. Timing recovery element 900 is configured to calculate a sampling phase control signal 902 based on the absolute value of the alternating sums. Timing recovery element 900 employs digital logic elements to calculate the following difference:

$$d = \text{abs}\left[\sum_{n=0}^{N1-1} (-1)^n f(n)\right] - \text{abs}\left[\sum_{n=0}^{N2-1} (-1)^n w(n)\right],$$

where f(n) and w(n) are the FFE and DFE filter coefficients, respectively, N1 is the number of FFE filter taps being summed, and N2 is the number of DFE filter taps being summed. It should be appreciated that the difference d may itself be utilized as the sampling phase control signal 902 or, alternatively, the difference may be conditioned or processed to obtain a suitable control signal 902. For example, a certain application may adjust the sampling phase in a stepwise manner; if so, then the sign of d may be utilized to shift the sampling phase up or down by one step.

As shown, the FFE and DFE filter tap coefficients are used as inputs into a multiplexer 904. In practice, each filter tap coefficient may be represented by a number of bits, e.g., sixteen. The output of multiplexer 904 feeds into an adder 906, which also receives the negative value of the sum from the last cycle (the output from a delay element 908). Adder 906 is configured to calculate the alternating sign sum of its inputs. The detailed operation of timing recovery element 900 is controlled by a control element 910.

Initially, the sum is reset by resetting the delay element 908. Then, the first N1 coefficients of FFE element 326 (see FIG. 3) are passed through multiplexer 904 and their alternating sum is computed. If the final sum of the coefficients is negative, then the sign is inverted by again passing the value through the adder with a zero input from multiplexer 904. The absolute value of this FFE alternating sum is then stored in a latch 912 for subsequent use, and the sum is reset. Next, the first N2 filter coefficients of DFE element 328 are passed through multiplexer 904 and their alternating sum is similarly calculated. As with the FFE sum, if the final DFE sum is negative, then the sign is inverted by again passing the value through adder 906 with a zero input from multiplexer 904. At this stage, latch 912 holds the absolute value of the alternating sum associated with the FFE coefficients and delay element 908 holds the absolute value of the alternating sum associated with the DFE coefficients.

Finally, the difference of the two absolute sums is obtained by passing the FFE sum through multiplexer 906 and subtracting the DFE sum from it. If the FFE sum is smaller than the DFE sum, then sampling phase control signal 902 causes the sampling phase to advance. If the FFE sum is larger than the DFE sum, then sampling phase control signal 902 causes the sampling phase to be delayed.

Figure 10:
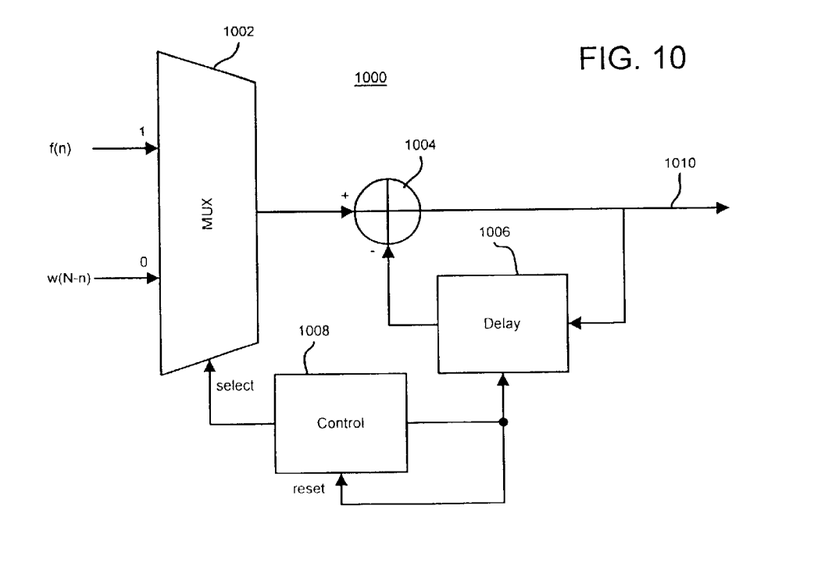
FIG. 10, is a schematic representation of an exemplary hardware solution for performing a correlation-based-alternate sum timing recovery technique.

Rather than the absolute value methodology described above, a practical implementation may calculate a correlation based alternating sum. FIG. 10 is a schematic depiction of an exemplary hardware implementation configured to calculate such a correlation based sum. The timing recovery element 1000 shown in FIG. 10 is preferably configured to calculate the following difference:

$$d = \sum_{n=0}^{N1-1} (-1)^n f(n+N0) - \sum_{n=0}^{N2-1} (-1)^n w(n).$$

The parameters N0 and N1 are selected in accordance with the sign and the desired position of the "center tap" associated with FFE element 326.

If the center tap of FFE element 326 has a positive/negative value and N0 is even/odd, then the timing recovery procedure will force the center tap to a tap with an even index and an odd index otherwise. This behavior results from the characteristic's of practical equalizers for well-behaved channels, where the alternating sum of the filter coefficients approximates the absolute sum (or its negative) of the coefficients. If the signs of the FFE coefficients are aligned with the alternating pattern of the alternating sum, then the alternating sum will be positive; otherwise, the alternating sum will be negative. In contrast, for well-behaved channels, the signs of the DFE coefficients will be aligned with the sign pattern of the alternating sum and, consequently, the alternating sum of the DFE coefficients will always be positive if N2 is properly selected. Since the alternating sum of the DFE coefficients is positive, the difference d will always be negative if the alternating sum of the FFE coefficients is negative. As a result, the sampling phase will always be adjusted in the same direction and the FFE coefficients would eventually be shifted by one filter tap. This shifting would align the signs of the FFE coefficients with the sign pattern of the alternating sum, thus driving d toward zero. Accordingly, if the signs of the FFE coefficients and the sign pattern of the alternating sum are not aligned, then the timing recovery procedure will adjust the sampling phase until they become aligned. Consequently, the FFE center tap will be at an even or an odd position, depending on the sign of the center coefficient and whether N0 is odd or even.

In a practical V.90 implementation, it has been determined that appropriate values for N1 and N2 are in the range of 5 to 10, assuming that FFE element 326 and DFE element 328 each have a length (i.e., the number of taps) in the range of 16 to 32. In addition, the value of N0 should be chosen such that the sum N0+N1 is less than the index of the "center-tap" of FFE element 326. As mentioned above, these numerical ranges are merely exemplary and are not intended to limit the scope of the invention in any way.

As with the implementation shown in FIG. 9, timing recovery element 1000 includes a multiplexer 1002 that receives the FFE and DFE filter tap coefficients. An adder 1004 and a delay element 1006 function as described above to calculate appropriate alternating sums associated with FFE element 326 and DFE element 328. The signs of the DFE coefficients and the signs of the DFE alternating sum can be aligned and the timing loop will force the alignment of the signs of the FFE coefficients with the sign pattern of the FFE alternating sum. Thus, there is no need for a calculation of the absolute sum in this embodiment. For this reason, the hardware implementation and control process carried out by control element 1008 can be simplified.

Timing recovery element 1000 performs the correlation based alternating sum calculation by initially resetting delay element 1006. As described above, the selected FFE coefficients are passed through multiplexer 1002 and their alternating sum is determined. Then, the selected DFE coefficients are passed through multiplexer 1002 and added to the alternating sum. The final sum is the difference, d, of the two alternating sums as defined above. A sampling phase control signal 1010 may be associated with the final difference, with the sign of the final difference, or with any suitable quantity based on the final difference, or any characteristic of the final difference.

The correlation based technique is relatively easy to implement and is robust to variations in gain and channel characteristics. Furthermore, the correlation based technique only allows every other tap to be a center tap position and, therefore, there is less risk of center tap drift and sample misalignment in the slicing process.

It should be noted that the alternating sum techniques described above are effective when the adaptive equalizer structure is being updated. However, because the sums are based on the current state of the filter tap coefficients, a locked or frozen equalizer structure will not reflect any changes to the sampling phase. Accordingly, if the adaptive equalizer structure is frozen or locked, then conventional timing recovery methods may be employed. In practice, the data communication receiver may include additional processing and/or hardware configured to switch between conventional timing recovery protocols and the timing recovery protocols described herein.

In summary, the present invention provides an improved timing recovery technique for a digital data communication system. The timing recovery technique is based on the impulse response of the receiver equalizer structure. The timing recovery techniques of the present invention are particularly suitable for use with a receiver having T-spaced equalizers, where echo cancellation is performed after equalization of the received signal. The preferred timing recovery technique can be effectively utilized throughout the normal operating mode of the digital data communication system and while the receiver equalizers are being updated. In addition, a timing recovery processing circuit according to the present invention can be implemented with high speed digital logic components in lieu of a digital signal processor.

The present invention has been described above with reference to a preferred embodiment. However, those skilled in the art will recognize that changes and modifications may be made to the preferred embodiment without departing from the scope of the present invention. For example, the particular analysis of the cost functions associated with the equalizer impulse response, the performance of the equalizer structure, and/or the optimization of the sampling phase may be implemented in different ways. In addition, the alternating sum and pre-cursor/post-cursor techniques may be carried out by a number of different hardware implementations. These and other changes or modifications are intended to be included within the scope of the present invention, as expressed in the following claims.

What is claimed is:

1. A timing recovery method for a high speed data communication device, said method comprising the steps of:

receiving a signal representative of a plurality of transmitted digital symbols;

sampling said signal to obtain a sequence of samples having a sampling phase associated therewith;

equalizing said sequence of samples with an adaptive equalizer structure;

analyzing an impulse response of said adaptive equalizer structure based on data indicative of a plurality of filter tap coefficients associated with said adaptive equalizer structure; and adjusting said sampling phase in response to said analyzing step to thereby substantially optimize a cost function associated with said impulse response.

2. A method according to claim 1, wherein:

said equalizing step produces an equalized sequence of samples; and said method further comprises the step of canceling an echo signal from said equalized sequence of samples, said echo signal being generated in response, to a signal transmitted by said data communication device.

3. A method according to claim 1, wherein said cost function is associated with an energy compactness cost function of said impulse response.

4. A method according to claim 3, wherein said analyzing step comprises the steps of:

deriving a combined impulse response of said adaptive equalizer structure and a fractional delay element;

comparing an energy compactness cost function of said combined impulse response to said energy compactness cost function of said impulse response; wherein said adjusting step adjusts said sampling phase in response to said comparing step.

5. A method according to claim 1, wherein said cost function is associated with a sum of a plurality of filter tap coefficients associated with said adaptive equalizer structure.

6. A method according to claim 5, wherein said sum is a weighted sum.

7. A method according to claim 5, wherein said adaptive equalizer structure comprises a pre-cursive equalizer element and a post-cursive equalizer element, and wherein said analyzing step comprises the steps of:

calculating a first sum of a plurality of filter tap coefficients associated with said pre-cursive equalizer element and a second sum of a plurality of filter tap coefficients associated with said post-cursive equalizer element; and determining a difference between said first and second sums; wherein said adjusting step adjusts said sampling phase in response to said difference.

8. A method according to claim 1, wherein:

said sampling step samples said signal at a rate of one sample per symbol; and said equalizing step equalizes said sequence of samples in accordance with a T-spaced methodology.

9. A timing recovery method for a high speed data communication device, said method comprising the steps of:

obtaining data indicative of a plurality of filter tap coefficients associated with an adaptive equalizer structure employed by said high speed data communication device;

processing said data to quantify a cost function associated with an impulse response of said adaptive equalizer structure; and generating a sampling phase control signal in response to said processing step, said sampling phase control signal being configured to adjust a sampling element associated with said high speed data communication device to thereby substantially optimize said cost function.

10. A method according to claim 9, wherein said data comprises data indicative of a plurality of filter tap coefficients associated with a pre-cursive equalizer element and data indicative of a plurality of filter tap coefficients associated with a post-cursive equalizer element.

11. A method according to claim 10, wherein said pre-cursive equalizer element comprises a feedforward equalizer (FFE) element and said post-cursive equalizer element comprises a decision feedback equalizer (DFE) element.

12. A method according to claim 10, wherein said processing step comprises the steps of:

calculating a first sum of a plurality of filter tap coefficients associated with said pre-cursive equalizer element;

calculating a second sum of a plurality of filter tap coefficients associated with said post-cursive equalizer element; and comparing said first and second sums.

13. A method according to claim 12, wherein said generating step generates said sampling phase control signal in response to said comparing step.

14. A method according to claim 12, wherein said first and second sums are alternating sums.

15. A method according to claim 9, wherein said processing step comprises the steps of:

deriving a first combined impulse response of said adaptive equalizer structure and a forward fractional delay element;

calculating a first energy compactness cost function associated with said first combined impulse response;

deriving a second combined impulse response of said adaptive equalizer structure and a backward fractional delay element;

calculating a second energy compactness cost function associated with said second combined impulse response; and comparing said first and second energy compactness cost functions.

16. A method according to claim 15, wherein said generating step generates said sampling phase control signal in response to said comparing step.

17. A data communication device for use in a high speed digital data communication system, said data communication device comprising:

a sampler configured to sample a received signal to thereby obtain a sampled signal having a sampling phase;

an adaptive equalizer structure configured to equalize. said sampled signal to generate an equalized output; and a timing recovery element operatively associated with said adaptive equalizer structure and with said sampler, said timing recovery element being configured to receive data indicative of a plurality of filter tap coefficients associated with said adaptive equalizer structure and to produce a sampling phase control signal responsive to said data.

18. A data communication device according to claim 17, wherein said adaptive equalizer structure is a T-spaced adaptive equalizer.

19. A data communication device according to claim 17 further comprising:

an echo canceler configured to produce an echo estimate for an echo signal generated in response to a signal transmitted by said data communication device; and means for subtracting said echo estimate from said equalized output.

20. A data communication device according to claim 17, wherein:

said adaptive equalizer structure comprises a feedforward equalizer (FFE) element and a decision feedback equalizer (DFE) element; and said timing recovery element is operatively associated with each of said FFE element and said DFE element.

21. A data communication device according to claim 17, wherein said timing recovery element produces said sampling phase control signal such that a cost function associated with an impulse response of said adaptive equalizer structure is substantially optimized.

22. A data communication device according to claim 21, wherein said timing recovery element comprises:

a fractional delay filter configured to emulate a sampling phase adjustment; and an energy compaction process element configured to calculate an energy compaction parameter associated with said adaptive equalizer structure combined with said fractional delay filter; wherein said sampling phase control signal is produced in response to said energy compaction.

23. A data communication device according to claim 21, wherein said timing recovery element comprises:

a pre-cursor measurement element configured to determine a pre-cursor response of said adaptive equalizer structure;

a post-cursor measurement element configured to determine a post-cursor response of said adaptive equalizer structure;

a comparator configured to obtain a difference between a quantity associated with said pre-cursor response and a quantity associated with said post-cursor response; wherein said sampling phase control signal is produced in response to said difference.

24. A data communication device according to claim 19 further comprising a slicer element configured to quantize an output of said means for subtracting, wherein said equalizer structure is responsive to an output of said slicer element.

* * * * *